US007933851B2

(12) United States Patent
Tuv

(10) Patent No.: US 7,933,851 B2
(45) Date of Patent: Apr. 26, 2011

(54) PROCESSING OF HIGH-DIMENSIONAL CATEGORICAL PREDICTORS IN CLASSIFICATION SETTINGS

(75) Inventor: Eugene Tuv, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1270 days.

(21) Appl. No.: 10/837,246

(22) Filed: Apr. 30, 2004

(65) Prior Publication Data

US 2005/0246361 A1 Nov. 3, 2005

(51) Int. Cl.
G06N 5/00 (2006.01)

(52) U.S. Cl. .......................................... 706/45
(58) Field of Classification Search .................... 706/12, 706/21, 45, 47
See application file for complete search history.

(56) References Cited

U.S. PATENT DOCUMENTS

| 6,327,581 B1 * | 12/2001 | Platt ................................. 706/12 |
| 6,519,580 B1 * | 2/2003 | Johnson et al. .................... 706/47 |
| 6,704,718 B2 * | 3/2004 | Burges et al. ...................... 706/21 |

OTHER PUBLICATIONS

Pereira, et al., Distributional Clustering of English Words, ACL '93 Proceedings of the 31st annual meeting on Association for Computational Linguistics, 1993, pp. 183-190.*
Breiman, L., et al., "Contents", *In: Classification and Regression Trees*, (1984), 5 pgs.
Hunt, E. B., et al., "Contents", *In: Experiments in Induction*, Academic Press, Inc., New York, NY, (1966), 5 pgs.
MacQueen, J., "Some Methods for Classification and Analysis of Multivariate Observations", *Proceedings of the Fifth Berkeley Symposium on Mathematical Statistics and Probability*, vol. 1, (1967), 19 pgs.
Quinlan, J. R., "Contents", *In: C4.5: Programs for Machine Learning*, (1988), 4 pgs.
Seidman, C., "Table of Contents", *In: Data Mining with Microsoft (r) SQL Server tm 2000 Technical Reference*, (2001), 7 pgs.
Tuv, E., et al., "Pre-Processing of High-Dimensional Categorical Predictors in Classification Settings", *Applied Artificial Intelligence*, 17, (2003), 419-429.

* cited by examiner

Primary Examiner — Wilbert L Starks, Jr.
(74) *Attorney, Agent, or Firm* — Schwegman, Lundberg & Woessner, P.A.

(57) ABSTRACT

Systems and methods provide for preprocessing non-metric response categories in order to efficiently cluster or partition predictors have similar responses. The non-metric response categories are transformed into distance vectors by calculating a frequency count for the response, transforming the frequency count to a proportional value, and calculating a distance vector using the vector of proportional values.

26 Claims, 4 Drawing Sheets

PROCESSING OF HIGH-DIMENSIONAL CATEGORICAL PREDICTORS IN CLASSIFICATION SETTINGS

FIELD

The inventive subject matter relates generally to systems that partition or classify data, and more particularly systems that process high-dimensional categorical predictors in classification settings.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2003, Intel Corporation. All Rights Reserved.

BACKGROUND

It is often desirable to build predictive models based on categorical predictors and responses. Such models may involve large numbers of categories (levels, unique values, etc.). For example, to build predictive models in industrial applications, it is not uncommon to encounter a categorical-predictor attribute with possibly hundreds or thousands of categories. Examples of such categorical predictors are the lot identifier of product in semiconductor manufacturing, part ID, zip codes, email domains, etc. In addition, the response variable may also be categorical (with the number of levels greater than two). Typically, the data have small numbers of observations per category of the predictor. The goal of building a predictive model is an efficient, computationally fast way to discover value-groups (partitions) of such high-cardinality predictors. Such groups may be used directly to partition the categories of the predictor with similar responses or for input to further analyses such as decision trees, neural networks, support vector machines, discriminant analysis, etc.

Unfortunately, in existing systems, if there are large numbers of categories and both the predictor category and response category are non-metric, then large amounts of time and computer resources are typically required. Alternatively there may be limitations imposed on the level of analysis. For example, some existing systems enforce a binary partition by selecting one distinguished value of a categorical predictor as one group, and the rest of the values combined into another group. As a further example, CART (classification and regression trees) uses an exhaustive search on all possible two-way groupings to minimize a selected measure of impurity (e.g. cross-entropy measure or Gini index). CART has $O(2^{n-1})$ complexity, where n is number of levels to be grouped. Many CART implementations (commercial and in academia) have restrictions on the number of levels of a categorical predictor (usually n=30).

Additionally, other algorithms used by current systems, such as agglomerative clustering, correspondence analysis, and systems using an $\chi^2$ based distance measure of the difference between rows also typically result in comparatively large numbers of computations and have $O(x^2)$ complexity.

In view of the above, there is a need in the art for the embodiments of the present invention.

DETAILED DESCRIPTION

Figure 1:
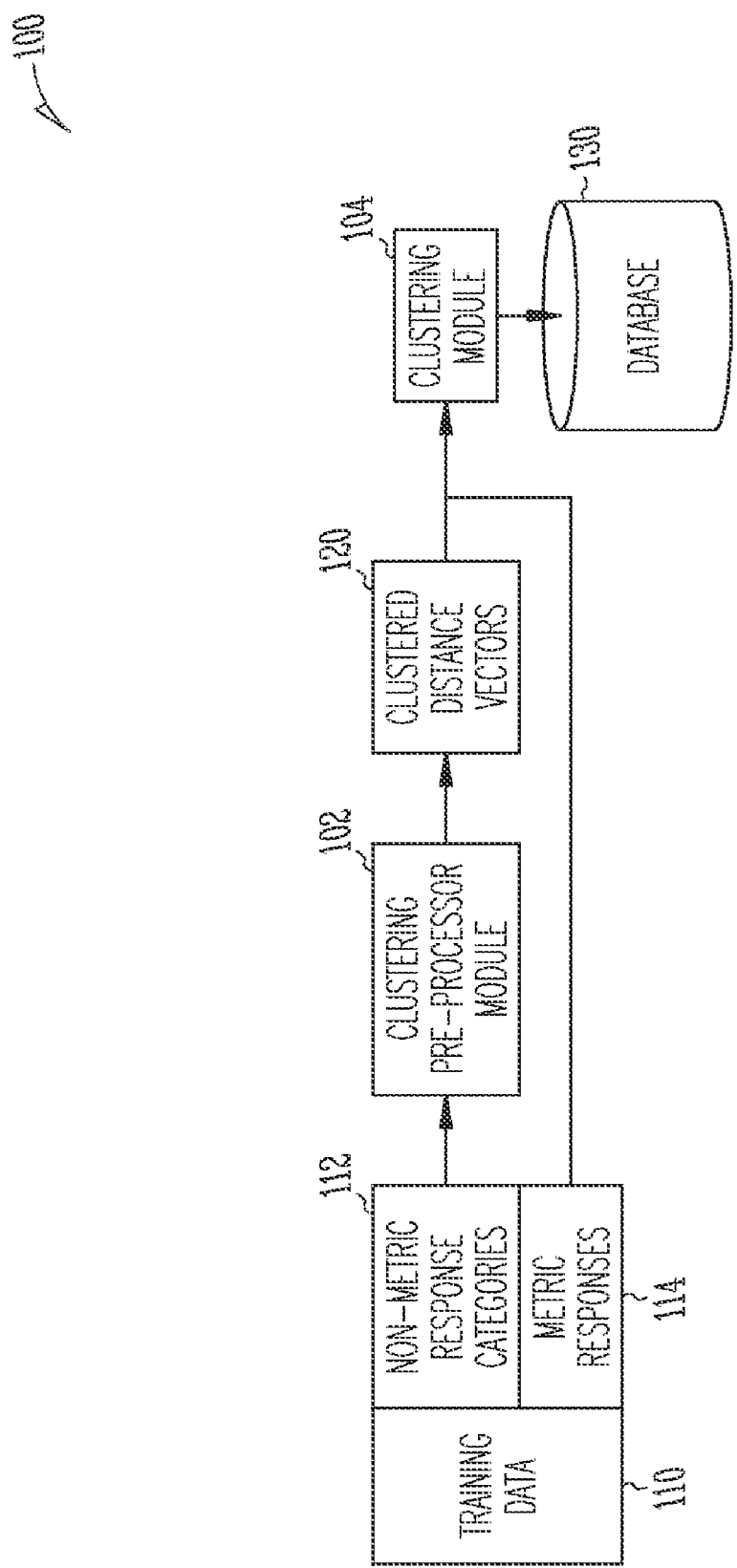
FIG. 1 is a block diagram illustrating an overview of a system incorporating embodiments of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the various embodiments of the invention, and it is to be understood that other embodiments may be utilized and that logical, mechanical, electrical and other changes may be made without departing from the scope of the inventive subject matter. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

In the detailed description that follows, some of the discussion will use the following example of predictors and response categories. The example uses Consumer Reports Auto Data from April, 1990 Consumer Reports' summary on 117 cars. For the illustrative example, Manufacturer country is used as the predictor and Reliability as the response (treated as an unordered response). The summarized frequency table is shown below in Table 1:

TABLE 1

| Country | Much better | Much worse | Average | Better | Worse |
|---|---|---|---|---|---|
| Germany | 0 | 1 | 2 | 1 | 0 |
| Japan | 13 | 0 | 3 | 2 | 0 |
| Japan/USA | 8 | 0 | 0 | 1 | 0 |
| Korea | 0 | 1 | 0 | 1 | 2 |
| Mexico | 0 | 0 | 1 | 1 | 0 |
| Sweden | 0 | 0 | 2 | 0 | 2 |
| USA | 0 | 16 | 18 | 2 | 8 |

CART applied to this data results in the following tree topology:
1) root
2) Country: Germany, Korea, Mexico, Sweden, USA
  4) Country: Germany, Mexico
  5) Country: Korea, Sweden, USA
3) Country: Japan, Japan/USA Thus, on the first level an exhaustive search on all $2^{7-1}$=64 possible two-way groupings gave as the best partition (based on the Gini criteria): Germany, Korea, Mexico, Sweden, USA and Japan, Japan/USA, as illustrated in table 2. The systems and methods of embodiments of the invention applied to the frequency table gave the same partition when two clusters were specified.

TABLE 2

| Country | Much better | Much worse | Average | Better | Worse |
|---|---|---|---|---|---|
| Germany Korea Mexico Sweden USA | 0 | 18 | 23 | 5 | 12 |
| Japan Japan/USA | 21 | 0 | 3 | 3 | 0 |

Further, at the next split CART partitions Germany, Korea, Mexico, Sweden, USA into Germany, Mexico and Korea, Sweden, USA. The three-cluster output of the systems and methods of embodiments of the invention show the same groupings.

TABLE 3

| Country | Much better | Much worse | Average | Better | Worse |
|---|---|---|---|---|---|
| Korea Sweden USA | 0 | 17 | 20 | 3 | 12 |
| Germany Mexico | 0 | 1 | 3 | 2 | 0 |
| Japan Japan/USA | 21 | 0 | 3 | 3 | 0 |

The categorical predictor in this simple example only uses seven categories. The novel preprocessing algorithm described below is expected to be especially useful when the number of categories is very large and an exhaustive search for the groups is infeasible.

The detailed description is divided into multiple sections. In the first section the software operating environment of different embodiments of the invention are described. In the second section methods according to various embodiments of the invention are described.

Operating Environment

FIG. 1 is a block diagram of the major components of a hardware and software operating environment 100 incorporating various embodiments of the invention. The systems and methods of the various embodiments of the invention may be incorporated on any hardware or software system that can receive the input data. Generally such hardware includes personal computers, server computers, mainframe computers, laptop computers, portable handheld computers, personal digital assistants (PDAs) and hybrids of the aforementioned devices. In some embodiments of the invention, operating environment 100 includes a cluster preprocessor module 102 and a clustering module 104.

In general, the embodiments of the invention operate as follows. Training data 110 may be sent to either cluster preprocessor module 102 or clustering module 104. The training data may include predictors and responses with both non-metric response categories 112 and data with metric response categories 114. Categories may also be referred to as levels. Non-metric categories are typically categories that do not represent a measured quantity. Examples of non-metric response categories include reliability ratings as described above, lot numbers, part identifiers, zip codes, email domains, equipment types, manufacturer identifications etc. The various embodiments of the invention are not limited to any particular non-metric response category. Metric response categories typically include quantities that may be measured, such as miles per gallon, mean time between failure, mean time to repair etc.

In some embodiments, data including non-metric response categories 112 are sent to cluster preprocessor module 102. In some embodiments, cluster preprocessor module 102 transforms the non-metric response categories 112 to produce clustered distance vectors 120. Further details on the methods used to perform this transformation are provided in the methods section below.

The clustered distance vectors may then be provided as input to clustering module 104 for further clustering.

Metric responses 114 typically do not require preprocessing and may be sent directly to clustering module 104 for processing.

Clustering module 104 clusters input data according to known clustering algorithms. The clustering algorithms may be hierarchical or nonhierarchical. The various embodiments of the invention are not limited to a particular clustering algorithm. Clustering module 104 may then store the clustered data in database 130. The clustered data may then be used by other programs for further analyses such as decision trees, neural networks, support vector machines, discriminant analysis, etc. that desire to make predictions based on the clusters in database 130.

Thus in general, cluster preprocessor module 102 operates on non-metric predictor and response categories that typically cannot be efficiently processed by current learning algorithms to produce a "preclustered" set of data with a reduced number of partitions that may then be efficiently used by many known learning algorithms.

The software modules such as the cluster preprocessor module 102 and the clustering module 104 running in the operating environment may be read from a machine-readable media and run under the control of an operating system, and interfaced with the operating system. Examples of such machine-readable media include hard disks, floppy disks, CD-ROMs, DVD-ROMs. Further, machine-readable media includes wired and wireless signals transmitted over a network. Examples of operating systems include Windows® 95, Windows 98®, Windows Me®, Windows CE®, Windows® NT, Windows 2000®, and Windows XP® by Microsoft Corporation. However, the embodiments of the invention are not limited to any particular operating system, and in alternative embodiments the software components may operate within the Palm OS® from Palm Inc., variants of the UNIX and Linux operating systems and cellular telephone operating systems.

Additionally, in varying embodiments the systems and methods may be implemented in firmware.

Methods

Figure 2A:
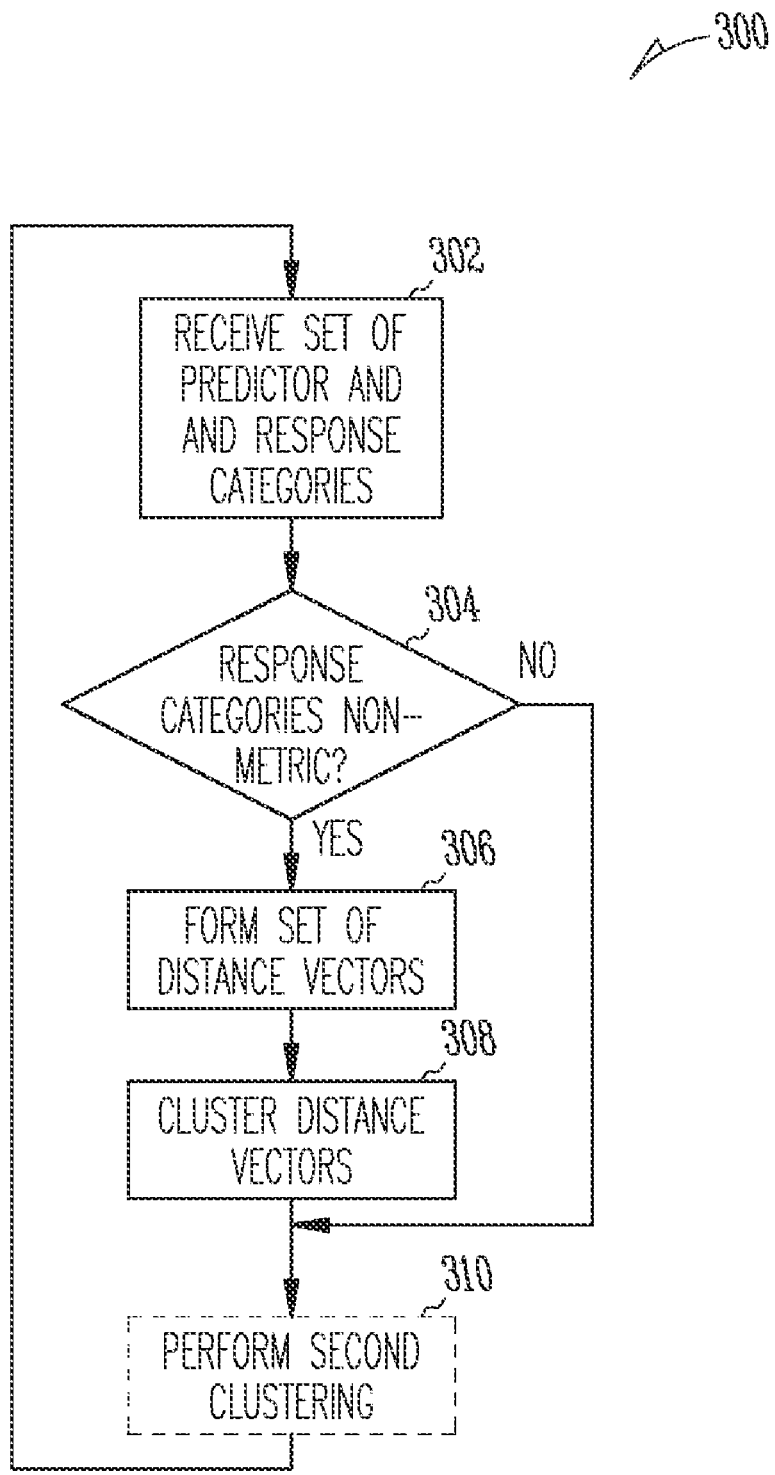
FIG. 2A is a flowchart illustrating a method for processing categorical responses according to embodiments of the invention.
Figure 2B:
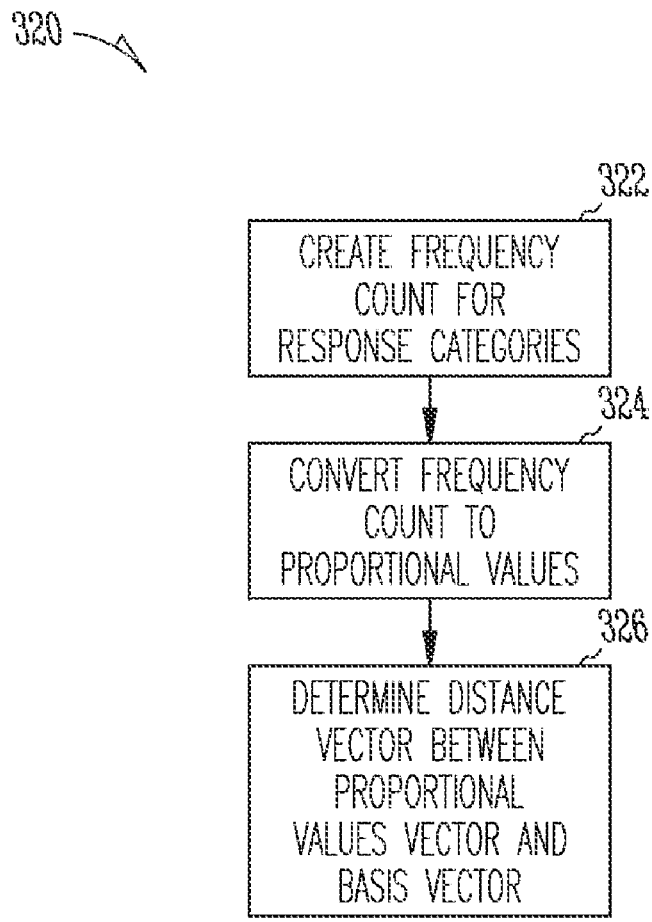
FIG. 2B is a flowchart illustrating a method for creating a distance vector from categorical responses according to embodiments of the invention.

FIGS. 2A and 2B are flowcharts illustrating methods for preprocessing non-metric response categories according to embodiments of the invention. The methods may be performed within an operating environment such as that described above with reference to FIG. 1. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from machine-readable media such as RAM, ROM, CD-ROM, DVD-ROM, flash memory etc.). The methods illustrated in FIGS. 2A and 2B are inclusive of the acts performed by an operating environment executing an exemplary embodiment of the invention.

FIG. 2A is a flowchart illustrating a method 300 for processing categorical responses according to an embodiment of the invention. The method begins by receiving a set of predictor and response categories (block 302). There may be more than one set of predictors and response categories in the set of data received. Additionally, the predictor and category types may vary from one set to another. For example, a first set may have metric responses while a second set may have non-metric responses.

Next, the system checks whether the set of categories include non-metric predictor and response categories (block 304). If not, the method proceeds to block 310 where clustering may be performed on the metric response data.

Otherwise, if the data includes non-metric predictor and response categories, the system proceeds to form a set of distance vectors from the non-metric response categories (block 306).

FIG. 2B is a flowchart providing further details on the processing performed at block 306 and illustrates a method 320 for creating a distance vector from non-metric categorical responses according to an embodiment of the invention. The method begins by creating a frequency count for the number of non-metric responses in each category (block 322). For example, in table 1, the frequency count where the non-metric category of "average" was supplied where the non-metric predictor value is "USA" is 18. In some embodiments, the predictor and response categories may be represented as a table of training data $T(i,j)$ having row and column dimensions r and c with r representing the number of categories for the predictor and c representing the number of categories for the response. Rows represent categories (or values) of the predictor $X(x_1, \ldots, x_r)$, and columns represent categories of the response $Y(y_1, \ldots, y_c)$ Next, in some embodiments of the invention the frequency count for each category in each row is converted to proportional values (block 324). In other words, the frequency count for a particular category in a row is divided by the total number of responses in the row. Let the proportion value $p_{ij}$ denote the proportion in cell (i; j) so that $$p_{i,j} = \frac{f_{i,j}}{f_i} \quad (1)$$

In some embodiments, the system then proceeds to determine a distance vector between the vector comprising the proportional values in a raw and a basis vector (block 326). In some embodiments, the distance vector is a Euclidean distance vector. In some embodiments, the $j_{th}$ basis (or pure) vector of Y of dimension c is defined to be 1 at the $j_{th}$ position and 0 elsewhere. The generalized distance to the $j_{th}$ pure/basis vector of Y from the $i_{th}$ level of X is defined as:

$$d(p, \beta) = \frac{e^{(1-p)\beta} - 1}{e^{(1+p)\beta} - 1} \quad (2)$$

where p comprises the proportional value and where β comprises a value selected to control a degree of discrimination. After a distance to each pure/basis node is computed, these distances replace the coordinates of the row vector in the table $T(f_{ij})$. That is, $f_{ij} = d(p_{ij}, \beta)$ for all i and j. Therefore, generalized distances in a coordinate system defined by the pure/basis nodes replace the frequencies in the table.

Figure 3:
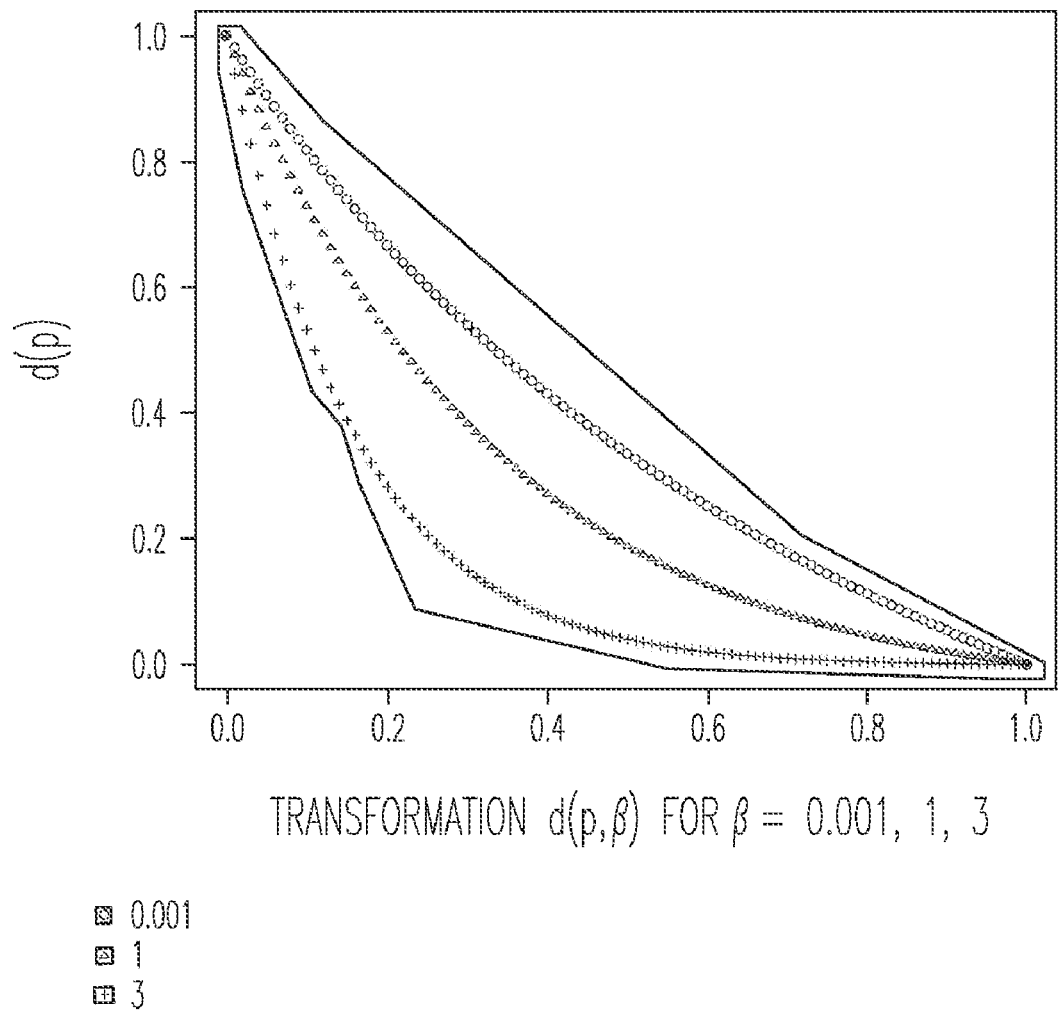
FIG. 3 is a chart illustrating transformation results using various parameter values for a distance vector calculation used in embodiments of the invention.

FIG. 3 is a chart illustrating transformation results using various parameter values for a distance vector calculation used in embodiments of the invention. In particular, the function d(p, β) is shown in FIG. 3 for selected values of β. Note that $X^2$-similarity statistics computed from the normalized $i_{th}$ level of X and $j_{th}$ basis vector of dimension Y is proportional to $$\frac{1 - p_{i,j}}{1 + p_{i,j}}$$

and this is the limit of d(pij; β) as β→0. It also can be seen from the graphs in FIG. 3 that these functions provide more power to discriminate between small values of p, and downplay differences between large ones. The degree of discrimination is controlled by the parameter β. Thus, Euclidian distance based on coordinates computed using this transformation may enhance desirable properties of $X^2$-distances.

Returning to FIG. 2A, after the transformation performed in block 306, a nonhierarchical clustering algorithm for continuous measurements may be used to cluster the rows (block 308). In some embodiments, K-means clustering may be applied to the rows. Further details on K-means clustering are provided in MacQueen, J. 1967. *Some methods for classification and analysis of multivariate observations*, Proceedings of the Fifth Berkley Symposium on Mathematical Statistics and Probability, volume 1: pp. 281-297, Berkeley, University of California Press. For example, a basic version of K-means (minimizing within-cluster sum of squares) to minimize computational complexity may be used. In particular embodiments, the initial cluster assignment may be random, and the algorithm stops when there are no changes in cluster membership or the maximum number of iterations is reached. The maximum number of iterations may be set at 10 in some embodiments. However, the embodiments of the invention are not limited to any particular value for the maximum number of iterations.

Next, in some embodiments a second clustering may be performed to further reduce the number of partitions (block 310). K-means clustering may be used as noted above to create a first number of groups (10 groups some embodiments), and then the second clustering may apply agglomerative clustering to the resulting groups to get a desirable number of partitions. Note that in agglomerative clustering $d(p_{ij}; \beta)$ coordinates are recalculated every time the closest (in terms of Euclidian distance) groups are merged then an agglomerative mechanism is applied to produce a nested sequence of clusters governed by a stopping rule.

Although various values for β may be used, in some embodiments, setting β=2 typically minimizes misclassification. If the goal of clustering is to minimize impurity, small values of β may provide a significant boost to the Gini impurity index.

It should be noted that while the above discussion has assumed that a table of predictor and response categories has been described, those of skill in the art will appreciate that other data structures could be used to represent the predictor and response categories. For example, a list of vectors, a linked list or other data structure could be used in addition to or instead of the table described above.

Further, those of skill in the art will appreciate that the functionality described above may be distributed across hardware, firmware and software modules in various manners.

The embodiments of the invention are not limited to any particular distribution of functionality.

Systems and methods for preprocessing non-metric response categories have been described. The embodiments of the invention provide advantages over previous systems. For example, the systems and methods of various embodiments of the invention are able to provide groupings that are typically as good as or better than previous systems and methods while reaching results faster and/or with less overhead. After groups are formed, subsequent analysis may be applied to predictor with fewer categories and therefore lower dimension and complexity.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that the inventive subject matter be limited only by the following claims and equivalents thereof.

What is claimed is:

1. A computer-implemented method comprising:
   receiving a set of predictor categories and response categories associated with the predictor categories; wherein the predictor categories and the response categories represent non-metric categories;
   forming a set of distance vectors by:
      converting the non-metric response categories to a vector of metric values, and
      transforming the vector of metric values to a distance vector;
   clustering the set of distance vectors using a nonhierarchical distance-based clustering algorithm; and
   storing the clustered set of distance vectors in a computer-readable medium.

2. The method of claim 1, wherein the distance vector comprises a Euclidean distance vector.

3. The method of claim 1, wherein the distance vector comprises an $X^2$ distance vector.

4. The method of claim 1, wherein converting the non-metric response categories includes creating a metric value comprising a frequency count for each of the response categories.

5. The method of claim 4 wherein converting the non-metric response categories further comprises converting the frequency count to a proportional value.

6. The method of claim 5, wherein components of the distance vector (d) are determined according to the formula:

$$d(p, \beta) = \frac{e^{(1-p)\beta} - 1}{e^{(1+p)\beta} - 1}$$

where p comprises the proportional value and where β comprises a value selected to control a degree of discrimination.

7. The method of claim 4, wherein the distance vector is determined as a distance of the vector of metric values from a basis vector.

8. The method of claim 1, further comprising submitting the set of clustered distance vectors to a second clustering procedure.

9. The method of claim 8, wherein the second clustering procedure comprises a hierarchical clustering procedure.

10. A system comprising:
    a cluster preprocessor module operable to:
       receive a set of predictor categories and response categories associated with the predictor categories; wherein the predictor categories and the response categories represent non-metric categories,
       convert the non-metric response categories to a vector of metric values, and
       transform the vector of metric values to a distance vector,
       place the distance vector in a set of distance vectors, and
       cluster the set of distance vectors using a nonhierarchical distance-based clustering algorithm; and
    a clustering module operable to receive the clustered set of distance vectors and operable to perform a second clustering of the clustered distance vectors and store the results of the second clustering on a computer-readable medium.

11. The system of claim 10, wherein the distance vector comprises a Euclidean distance vector.

12. The system of claim 10, wherein the distance vector comprises an $X^2$ distance vector.

13. The system of claim 10, wherein converting the non-metric response categories includes creating a metric value comprising a frequency count for each of the response categories.

14. The system of claim 13 wherein converting the non-metric response categories further comprises converting the frequency count to a proportional value.

15. The system of claim 14, wherein components of the distance vector (d) are determined according to the formula:

$$d(p, \beta) = \frac{e^{(1-p)\beta} - 1}{e^{(1+p)\beta} - 1}$$

where p comprises the proportional value and where β comprises a value selected to control a degree of discrimination.

16. The system of claim 13, wherein the distance vector is determined as a distance of the vector of metric values from a basis vector.

17. The system of claim 10, wherein the second clustering comprises a hierarchical clustering procedure.

18. A non-transitory machine readable medium having machine executable instructions for causing one or more processors to perform a method comprising:
    receiving a set of predictor categories and response categories associated with the predictor categories; wherein the predictor categories and the response categories represent non-metric categories;
    forming a set of distance vectors by:
    converting the non-metric response categories to a vector of metric values, and transforming the vector of metric values to a distance vector;
    clustering the set of distance vectors using a nonhierarchical distance-based clustering algorithm; and
    storing the clustered set of distance vectors in a non-transitory computer-readable medium.

19. The machine-readable medium of claim 18, wherein the distance vector comprises a Euclidean distance vector.

20. The machine-readable medium of claim 18, wherein the distance vector comprises an $X^2$ distance vector.

21. The machine-readable medium of claim 18, wherein converting the non-metric response categories includes creating a metric value comprising a frequency count for each of the response categories.

22. The machine-readable medium of claim 21 wherein converting the non-metric response categories further comprises converting the frequency count to a proportional value.

23. The machine-readable medium of claim 22, wherein components of the distance vector (d) are determined according to the formula:

$$d(p, \beta) = \frac{e^{(1-p)\beta} - 1}{e^{(1+p)\beta} - 1}$$

where p comprises the proportional value and where $\beta$ comprises a value selected to control a degree of discrimination.

24. The machine-readable medium of claim 21, wherein the distance vector is determined as a distance of the vector of metric values from a basis vector.

25. The machine-readable medium of claim 18, further comprising submitting the set of clustered distance vectors to a second clustering procedure.

26. The machine-readable medium of claim 25, wherein the second clustering procedure comprises a hierarchical clustering procedure.

* * * * *